(12) United States Patent
Razzano

(10) Patent No.: US 6,564,909 B1
(45) Date of Patent: May 20, 2003

(54) WEAR DETECTOR FOR A VEHICLE BRAKING MEMBER

(75) Inventor: Tancredi Razzano, Piova' Massaia (IT)

(73) Assignee: I.C.P. S.r.l., Turin (IT)

( * ) Notice: Subject to any disclaimer, the term of this patent is extended or adjusted under 35 U.S.C. 154(b) by 0 days.

(21) Appl. No.: 09/569,856

(22) Filed: May 12, 2000

(30) Foreign Application Priority Data

| May 14, 1999 | (IT) | ..... TO99A000408 |
| Apr. 12, 2000 | (IT) | ..... TO2000A0344 |

(51) Int. Cl.$^7$ ............................................. F16D 66/00
(52) U.S. Cl. ................. 188/1.11 L; 340/454; 116/208
(58) Field of Search .............. 188/1.11 R, 1.11 W, 188/1.11 L, 1.11 E; 340/453, 457.3, 454; 116/208

(56) References Cited

U.S. PATENT DOCUMENTS

| 3,805,228 A | * | 4/1974 | Peeples ..................... 200/61.4 |
| 3,893,543 A | * | 7/1975 | Sibatani et al. ............. 188/1 A |
| 3,958,445 A | * | 5/1976 | Howard et al. ................. 73/7 |
| 3,975,706 A | * | 8/1976 | Kato ......................... 340/52 A |
| 3,986,164 A | * | 10/1976 | Hirai et al. ................ 340/52 A |
| 4,011,655 A | * | 3/1977 | Beaudoin et al. ....... 264/211.11 |
| 4,188,613 A | * | 2/1980 | Yang et al. ................ 340/52 A |
| 4,204,190 A | * | 5/1980 | Wiley et al. .............. 340/52 A |
| 4,641,519 A | | 2/1987 | Klein et al. |
| 4,646,001 A | * | 2/1987 | Baldwin et al. ........... 324/65 P |
| 4,850,454 A | * | 7/1989 | Korody ..................... 188/1.11 |
| 4,884,434 A | * | 12/1989 | Satake et al. ..................... 73/7 |
| 4,912,407 A | * | 3/1990 | Gualtieri et al. ............ 324/204 |
| 5,559,286 A | * | 9/1996 | White et al. ................ 340/454 |
| 5,608,376 A | * | 3/1997 | Ito et al. .................... 340/454 |
| 5,651,431 A | * | 7/1997 | Kyrtsos .................. 188/1.11 L |
| 5,835,009 A | * | 11/1998 | Hanisko ..................... 340/454 |
| 6,250,429 B1 | * | 6/2001 | Kramer ................. 188/1.11 L |
| 6,302,241 B1 | * | 10/2001 | Gronowicz, Jr. ........ 188/1.11 L |
| 6,338,397 B1 | * | 1/2002 | Gezgin et al. .......... 188/1.11 L |
| 6,345,700 B1 | * | 2/2002 | Zenzen .................. 188/1.11 L |
| 6,360,850 B1 | * | 3/2002 | Odisho et al. .......... 188/1.11 L |
| 6,386,237 B1 | * | 5/2002 | Chevalier et al. ........... 138/104 |
| 6,450,300 B1 | * | 9/2002 | Kramer .................. 188/1.11 L |

FOREIGN PATENT DOCUMENTS

| DE | 2450761 | | 4/1976 | |
| DE | 8710053 | | 9/1987 | |
| EP | 0077206 | * | 4/1983 | ........... F16D/66/02 |
| EP | 0465954 | | 1/1992 | |

* cited by examiner

*Primary Examiner*—Jack Lavinder
*Assistant Examiner*—Benjamin A. Pezzlo
(74) *Attorney, Agent, or Firm*—Shlesinger, Arkwright & Garvey LLP

(57) ABSTRACT

A vehicle braking member has a block of friction material cooperating in sliding manner with a respective member for braking, and supports a wear detector wherein a resistive element, consumed simultaneously with the block of friction material, has a first electric terminal set, in use, to a reference potential, and a single second electric terminal cooperating in sliding manner with the member for braking so as to be set to the same potential as the member for braking.

7 Claims, 3 Drawing Sheets

WEAR DETECTOR FOR A VEHICLE BRAKING MEMBER

The present invention relates to a wear detector for a vehicle braking member, in particular a vehicle brake pad, to which the following description refers purely by way of example.

BACKGROUND OF THE INVENTION

To detect the wear of a braking member comprising a block of friction material, wear threshold detectors are used, which only generate a warning signal when the block of friction material reaches a wear threshold at which the braking member must be replaced.

As opposed to a limit wear condition, however, recent demand is for determining wear of the block of friction material as continuously as possible throughout the working life of the braking member, so as to closely monitor the brake pads on the vehicle at all times.

SUMMARY OF THE INVENTION

It is an object of the present invention to provide a wear detector for a vehicle braking member, designed to detect wear of the braking member continuously, and which, at the same time, is cheap and easy to produce and provides for a high degree of reliability and efficiency.

According to the present invention, there is provided a wear detector for a vehicle braking member comprising a block of friction material cooperating in sliding manner with a respective metal body; the detector comprising connecting means for connection to said braking member, and detecting means for detecting wear of said block of friction material; characterized in that said detecting means comprise a resistive element consumed simultaneously with said block of friction material and in turn comprising a first electric terminal set, in use, to a reference potential, and a single second electric terminal cooperating in sliding manner with said metal body so as to be set to the same potential as the metal body.

The present invention also relates to a vehicle braking member.

According to the present invention, there is provided a vehicle braking member comprising a block of friction material cooperating in sliding manner with a respective metal body, and a detector comprising detecting means for detecting wear of said block of friction material; characterized in that said detecting means comprise a resistive element consumed simultaneously with said block of friction material and in turn comprising a first electric terminal set, in use, to a reference potential, and a single second electric terminal cooperating in sliding manner with said metal body so as to be set to the same potential as the metal body.

BRIEF DESCRIPTION OF THE DRAWINGS

A non-limiting embodiment of the invention will be described by way of example with reference to the accompaning drawings, in which.

DETAILED DESCRIPTION OF THE INVENTION

Figure 1:
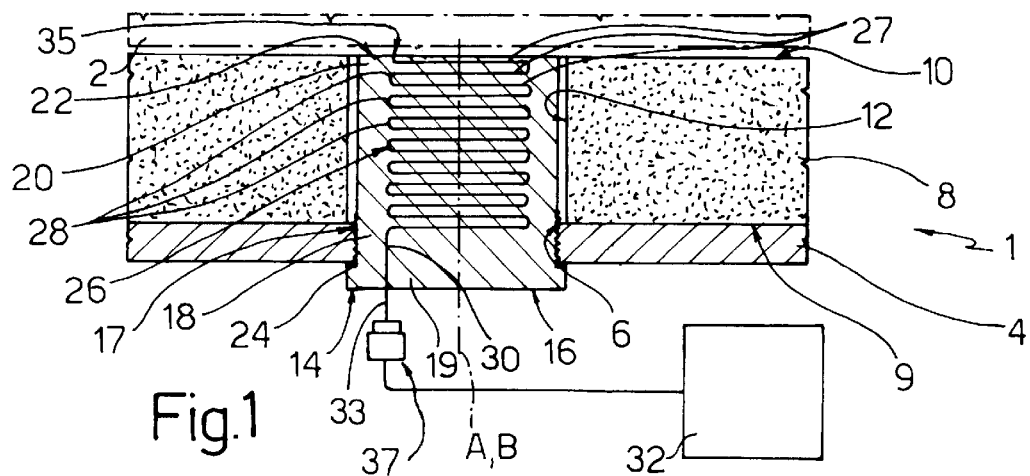
FIG. 1 shows a partial section of a preferred embodiment of the wear detector according to the present invention fitted to a vehicle braking member.

Number 1 in FIG. 1 indicates as a whole a braking member—in this case, a brake pad (shown partly) fitted to a known brake caliper (not shown) and pushed by a known actuator (not shown) of the caliper against a metal brake disk 2 (shown partly) in a direction A perpendicular to disk 2, so as to cooperate in sliding manner with disk 2.

As shown in FIG. 1, brake pad 1 comprises a metal plate 4, which has a threaded through hole 6 extending parallel to direction A, and supports a block 8 of friction material.

Block 8 of friction material is defined by two opposite surfaces 9 and 10; surface 9 being connected to plate 4; and surface 10 facing disk 2 to cooperate in sliding manner with disk 2 when braking.

In the example shown, block 8 comprises a circular through hole 12 extending coaxially with hole 6, larger in diameter than hole 6, and partly housing a wear detector 14 for detecting wear of block 8 of friction material at all times.

Detector 14 comprises a substantially cylindrical supporting body 16 having an axis B parallel to direction A; and a screw-nut screw device 17 for connection to plate 4, and in turn comprising a threaded portion 18 integral with body 16 and screwed inside hole 6.

Body 16 is formed in one piece from electrically insulating material—preferably polyimide material—and comprises two end portions 19 and 20 at opposite axial ends of portion 18; portion 20 extending inside hole 12 and having an end surface 22 coplanar with surface 10, so as cooperate in sliding manner with brake disk 2; and portion 19 resting axially against a number of locating spacers 24 interposed between portion 19 and metal plate 4.

Detector 14 also comprises a resistive element 26 embedded in body 16 and extending in direction A to a dimension substantially equal to the distance between surfaces 9 and 10. Element 26 is defined by a continuous, constant-section metal wire preferably made of copper-based alloy or ferronickel and longer than the distance between surfaces 9 and 10. The metal wire is curved or wound bellowsfashion inside body 16, and comprises a number of portions 27 crosswise to direction A and connected to one another by curved portions to define a number of loops 28. Element 26 also comprises an electric terminal 30 connected by an output cable 33 (shown schematically) to a central control unit 32 (not shown) of the vehicle; and a free end surface 35 coplanar with surface 22 and facing brake disk 2 to define a single second electric terminal cooperating in sliding manner with brake disk 2.

In a first and second variation not shown, element 26 is respectively wound in the form of a spiral inside body 16, and is defined by a continuous metal strip also preferably made of a copper-based alloy or ferronickel.

Figure 2:
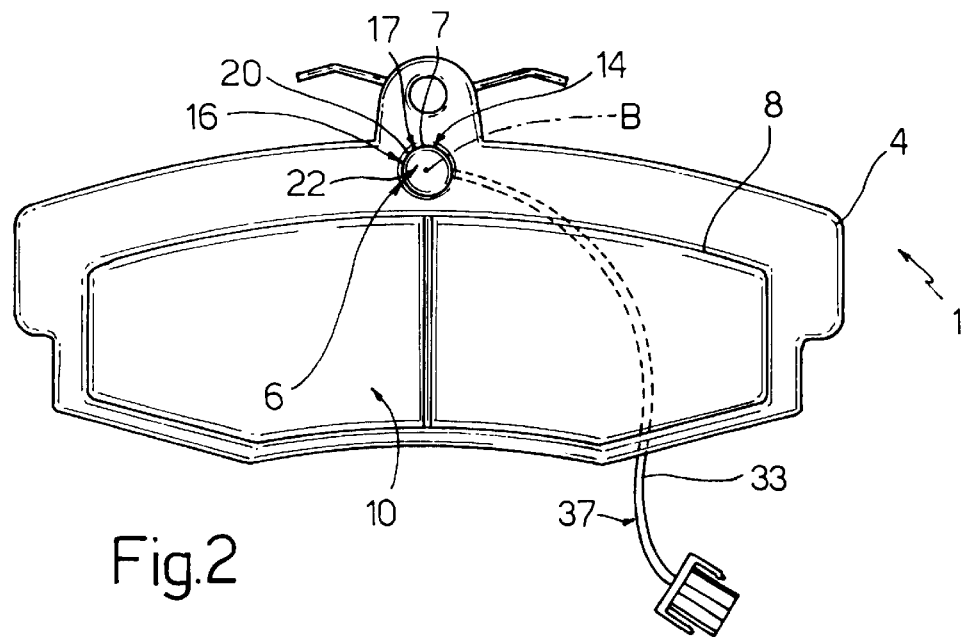
FIG. 2 shows a front view of the FIG. 1 wear detector in a different position from that in FIG. 1.

In the FIG. 2 variation, block 8 of friction material has no hole 12, and detector 14 extends laterally outside block 8.

Figure 3:
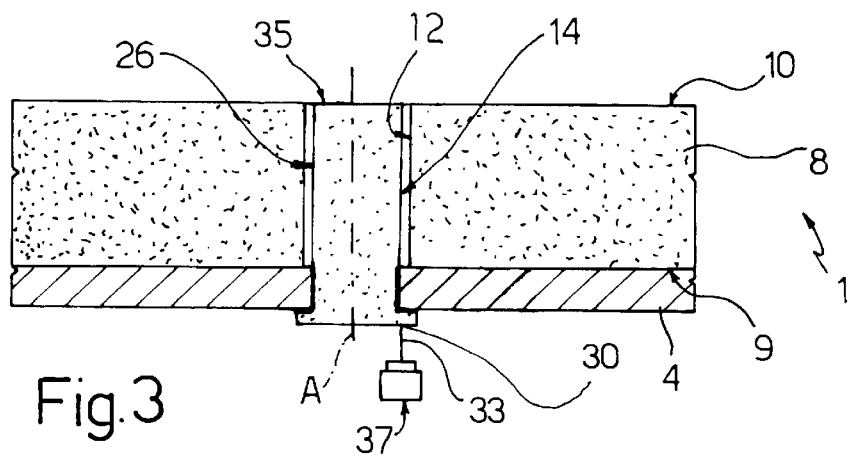
FIG. 3 is similar to FIG. 1, and shows a first variation of the FIG. 1 wear detector.

In the FIG. 3 variation, detector 14 has no body 16, and element 26 is defined by a substantially cylindrical, monolithic block, which is made from a resistive mixture containing particles of conducting material, e.g. graphite, is connected to plate 4, and is insulated electrically from plate 4 and block 8 of friction material. Alternatively, detector 14 may also comprise supporting body 16.

Figure 6:
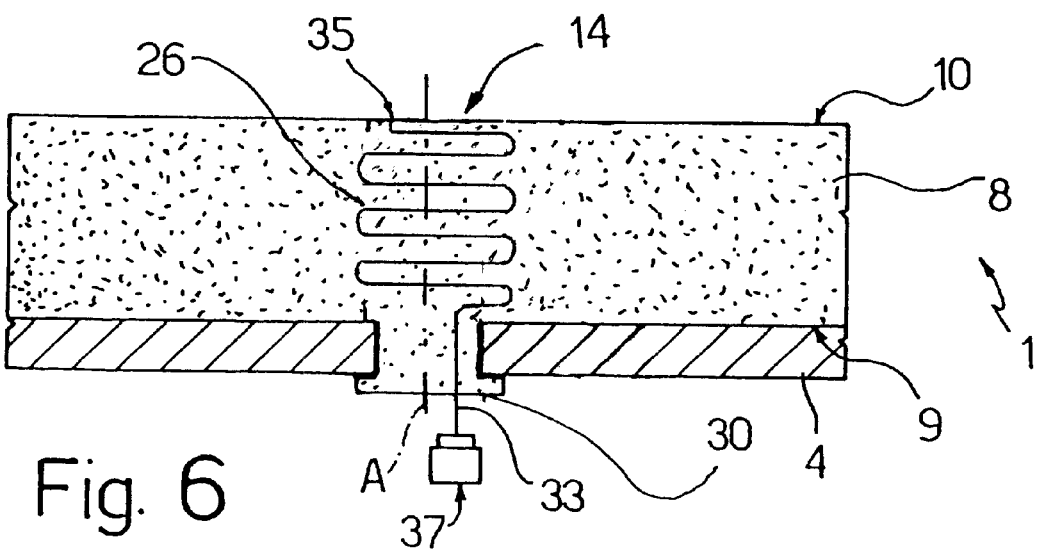
FIG. 6 shows another embodiment of the wear detector according to the present invention, showing an electrical element embedded directly within a block of friction material.

In a further variation shown in FIG. 6, detector 14 comprises an element 26 embedded directly in block 8 of friction material, electrically insulated from block 8, and with terminal 35 extending on surface 10.

Body 16, element 26 and cable 33 form part of a detecting circuit 37 for detecting wear of block 8 of friction material.

In actual use, in fact, element 26 is consumed simultaneously with block 8 of friction material, and decreases gradually in length, and hence in electric resistance, alongside a reduction in the thickness of block 8 measured between surfaces 9 and 10 in direction A.

Electric terminal 35 therefore changes position as element 26 is consumed, and is set to the same potential as brake disk 2 when surface 10 and, therefore, terminal 35 itself are positioned contacting brake disk 2; whereas terminal 30 is set to a reference potential by central control unit 32. By determining the difference in potential between terminals 30 and 35 and the relative electric current flow in circuit 37, central control unit 32 determines the electric resistance value of element 26 and, therefore, the thickness of block 8 of friction material on the basis of the shape and length of element 26.

Figure 4:
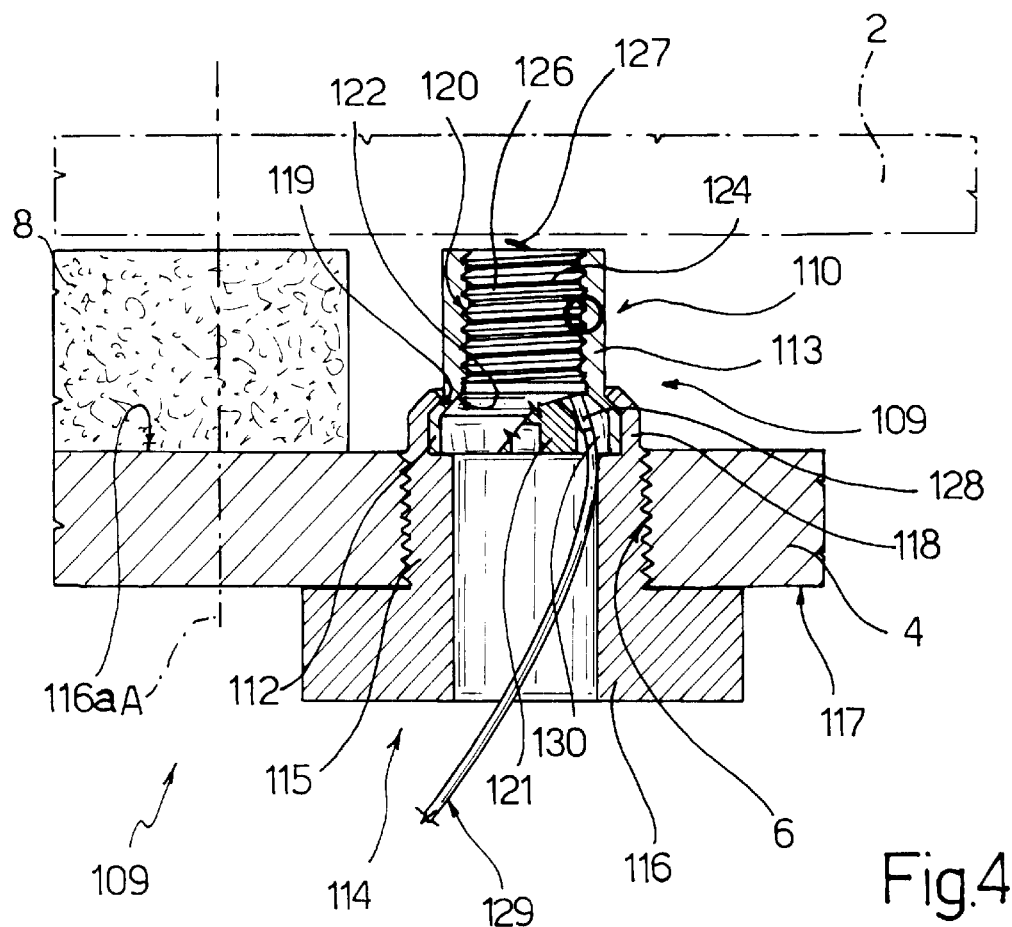
FIG. 4 shows a partial section of a second variation of the FIG. 1 wear detector.
Figure 5:
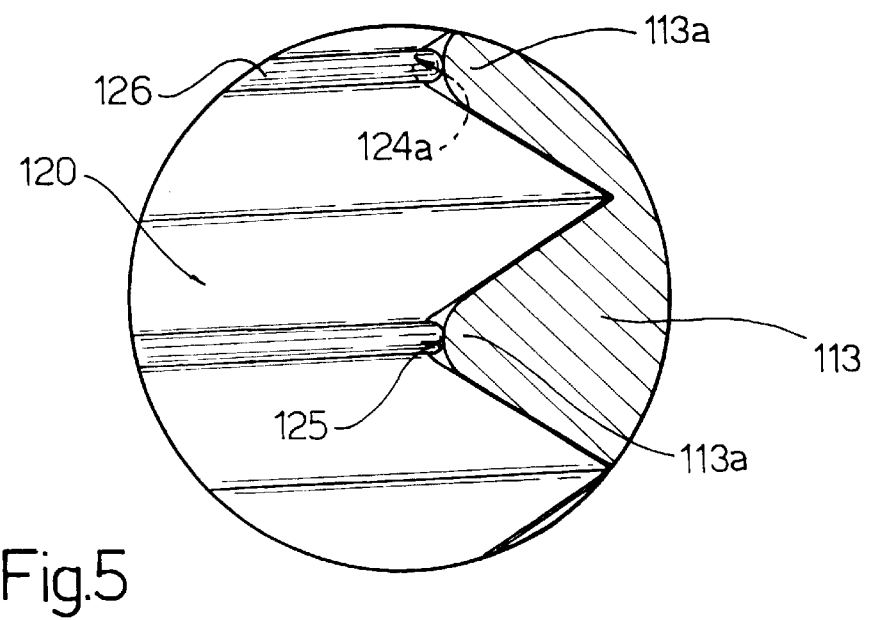
FIG. 5 shows a much larger-scale view of a detail in FIG. 4.

In the further variation shown in FIGS. 4 and 5, the FIG. 2 brake pad 1 is provided with a wear detector 109, which, like detector 14, is consumed together with block 8 of friction material, and is connected to central control unit 32 to detect the wear of block 8 of friction material at all times.

In the example shown, however, detector 109 comprises a tubular connecting body 110 made of electrically insulating, heat-resistant material—preferably a polyimide material, such as that known by the trade name of "VESPEL®"—and which projects from plate 4 towards disk 2, and in turn comprises an end or connecting portion 112 for connection to plate 4, and an internally threaded sleeve 113 projecting, parallel to direction A, towards disk 2 to a length equal to that of block 8 measured in the same direction.

End portion 112 is connected to plate 4 by a releasable connecting device, which, in the example shown, comprises a hollow screw body 114 in turn comprising a threaded shank 115 screwed inside hole 6, a head 116 facing a surface 117 of plate 4, and a connecting or clinching portion 118, which projects beyond the surface 116a of plate 4 opposite surface 117, and defines a retaining seat 119 for housing and retaining end portion 112.

Tubular body 110 houses a screw 120, which forms part of detector 109, is conveniently made of the same material as tubular body 110, and comprises a head 121 housed inside, and resting on an inner annular shoulder 122 of, end portion 112, and an externally threaded shank 124 extending the full length of sleeve 113 and mating with sleeve 113 to define a screw-nut screw connection. The threads of sleeve 113 and shank 124 are so formed that the helical groove 124a (FIG. 5) on shank 124 and the thread 113a of sleeve 113 define, in between, a continuous helical conduit 125 housing a single constant-section wire 126 made of conducting material, conveniently a ferronickel alloy. Wire 126 forms part of detector 109, is of a diameter approximately equal to but no smaller than the diameter of conduit 125, and comprises an end portion 127, which projects beyond the end face surface of shank 124 cooperating, in use, in sliding manner with disk 2, is initially sheared flush with shank 124 by disk 2, and subsequently cooperates in contact with, and is brought to the same potential as, disk 2. Wire 126 also comprises an end portion opposite portion 127 and connected to an electric terminal 128 set, in use, to a reference potential by a cable 129 for connection to central control unit 32. Cable 129 extends through body 114, and terminal 128 is housed inside an outer channel 130 formed in head 121 of screw 120, and is welded to head 121.

In a variation not shown, head 121 comprises a through hole housing terminal 128.

To assemble detector 109, wire 126 is wound about shank 124 of screw 120, inside groove 124a defined by the thread of screw 120; screw 120 is then inserted inside body 110, and shank 124 is screwed inside sleeve 113 so that head 121 rests on shoulder 122. As shank 124 is screwed in, wire 126 is gradually forced, by thread 113a of sleeve 113, inside groove 124a and so arranged along a helical path and held in a fixed position with respect to screw 120 throughout the working life of pad 1.

Wear detectors 14, 109 therefore provide for continuously detecting the thickness of block 8 of friction material and so monitoring gradual wear of block 8 throughout the working life of brake pad 1 by virtue of resistive elements 26, 126, which, being consumed simultaneously with the friction material, have an electric resistance varying continuously as a function of the wear of block 8.

The presence of variable resistive elements also enables central control unit 32 to continuously determine and indicate any malfunctioning of the detectors or brake pad 1 as a whole. That is, in the event central control unit 32 detects no electric signal when braking, or detects a constant abnormal signal in any operating condition, this may mean, for example, that brake pad 1 is jammed with respect to brake disk 2, that detector 14, 109 is not connected properly to brake pad 1, or that the circuit connecting the detector to the central control unit is damaged.

As will be clear from the foregoing description, detectors 14, 109 are extremely easy to produce, by comprising only one resistive element 26, 126 defined by a straightforward elongated metal element—conveniently a metal wire—having only two electric terminals, only one of which is connected to central control unit 32, thus also enabling fast, easy connection to the control unit.

Moreover, the form of the resistive element—wound into loops or extending along a helical and, in general, partly curved path—provides for greater electric resistance than would be available if the resistive element were straight and extended, for example, parallel to direction A. This provides not only for an extremely high degree of accuracy, reliability and sensitivity, but also for obtaining electric terminals 35, 127 with a relatively extensive contact area and, therefore, effective, reliable electric contact with brake disk 2.

As regards detector 109, using a screw as a supporting body and a nut screw for forcing the wire against the screw enables the resistive element to be arranged along a given fixed path, and to be kept in position even alongside gradual wear of screw 120, sleeve 113 and block 8 of friction material. In other words, the mechanical screw-nut screw positioning and retaining assembly prevents any withdrawal and/or change in position of the resistive element as this slides and is worn down against the member being braked, and keeps the rest of the resistive element in the initial configuration at all times.

Clearly, changes may be made to detectors 14, 109 as described herein without, however, departing from the scope of the present invention.

In particular, elongated elements 26, 126 may be formed differently from those described, and comprise, for example, a number of elongated metal elements extending along paths other than those indicated by way of example. Screw 120 of detector 109 may be replaced with a supporting body having a not necessarily helical groove or, in general, an elongated seat; and wire 126, or any other resistive element, may be retained inside the groove or seat by means of a straightforward tubular body fitted onto the supporting body.

Finally, detectors 14, 109 described may, obviously, not only be connected to the brake pad otherwise than as described, but may also be connected to any other braking member, e.g. a brake block, by means of a connecting device similar to or differing entirely from the one described.

What is claimed is:

1. A wear detector for a vehicle braking member having a block of friction material for cooperating in sliding manner with a respective metal body, comprising:

a) an elongated resistive element for being consumed simultaneously with the block;

b) said resistive element including a first electric terminal set, in use, to a reference potential, and a second electric terminal for cooperating in sliding manner with the metal body so as to make electrical contact with the metal body and be set to the same potential as the metal body, such that changes to the electric resistance of said element as it is consumed during use determines the thickness of the block; and c) a supporting body having an external groove to at least partly house said resistive element in a given initial configuration and at least one retaining element to maintain said resistive element in a fixed position inside said groove.

2. A wear detector as in claim 1, wherein said retaining element extends the full length of said elongated element.

3. A wear detector as in claim 1, wherein said retaining element forces said elongated element inside said seat.

4. A wear detector as in claim 1, wherein said groove is helical.

5. A wear detector as in claim 1, wherein:

a) said supporting body comprises an externally threaded portion; and b) said elongated element is wound about said threaded portion.

6. A wear detector as in claim 1, wherein:

a) said retaining element is defined by a body comprising a nut screw portion; and b) said threaded and nut screw portions mate to define a screw-nut screw coupling.

7. A wear detector as in claim 1, wherein said supporting body carries said first electric terminal.

* * * * *